UNITED STATES PATENT OFFICE.

PAUL THOMASCHEWSKI, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

935,827. Specification of Letters Patent. Patented Oct. 5, 1909.

No Drawing. Application filed May 29, 1909. Serial No. 499,147.

*To all whom it may concern:*

Be it known that I, PAUL THOMASCHEWSKI, doctor of philosophy, chemist, citizen of the German Empire, residing at Vohwinkel, near Elberfeld, Germany, have invented new and useful Improvements in New Vat Dye, of which the following is a specification.

My invention relates to the production of new anthracene derivatives. They are obtained by converting an aminoanthraquinone into its derivatives containing in the amino group an oxy-naphthyl-carbonyl group

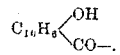

$$C_{10}H_6\diagup\begin{matrix}OH\\CO-\end{matrix}$$

The reaction is carried out by treating an aminoanthraquinone with a naphthol carboxylic acid.

The new products are after being dried and pulverized colored powders practically insoluble in water; soluble in concentrated sulfuric acid with from a red to brown to olive color. They yield on treatment with hydrosulfite and caustic soda lye from red to brown vats suitable for dyeing and printing the textile fiber from yellow to red to brown to violet shades. They also form valuable lakes.

In order to illustrate the new process I can proceed as follows, the parts being by weight:—10 parts of 1-aminoanthraquinone are heated to 125° C. with 100 parts of nitrobenzene, 10 parts of 2-naphthol-3-carboxylic acid and 8 parts of $SOCl_2$. The new condensation product crystallizes from the cooling liquid in the shape of orange-yellow prisms which are filtered off and dried. It is soluble in pyridin with a yellow color, in concentrated sulfuric acid with a reddish-brown color. By treatment with hydrosulfite and NaOH a red vat is obtained which dyes cotton, wool or silk pure yellow shades. Other aminoanthraquinones or other naphthol-carboxylic acids may be used. Products of similar qualities are thus obtained, *e. g.* from 1-aminoanthraquinone and 1-naphthol-2-carboxylic acid (dyes brownish-yellow), from 1.5-diaminoanthraquinone and 2-naphthol-3-carboxylic acid (dyes reddish-yellow).

I claim:—

1. The herein described new vat dyestuffs of the anthracene series which can be obtained from a naphthol-carboxylic acid and an aminoanthraquinone, which dyestuffs are, after being dried and pulverized, colored powders practically insoluble in water, soluble in concentrated sulfuric acid with a red to brown to olive color; giving from orange to red to brown vats with hydrosulfite and caustic soda lye, which vats dye the textile fiber from yellow to red to brown to violet shades, substantially as described.

2. The herein described new vat dyestuff of the anthracene series which is the oxynaphthyl-carbonyl-1-aminoanthraquinone, which dyestuff is, after being dried and pulverized, an orange-yellow powder which is soluble in pyridin with a yellow color; soluble in concentrated sulfuric acid with a reddish-brown color; giving a red vat with hydrosulfite and caustic soda lye, which vat dyes the textile fiber beautiful yellow shades, substantially as described.

In testimony whereof I have hereunto set my hand in the presence of two subscribing witnesses.

PAUL THOMASCHEWSKI. [L. S.]

Witnesses:
 OTTO KÖNIG,
 WILLY KLEIN.